(12) United States Patent
Peters

(10) Patent No.: US 8,815,134 B2
(45) Date of Patent: Aug. 26, 2014

(54) PROCESS FOR MANUFACTURING POLYOLEFIN FILMS

(75) Inventor: Martinus Wilhelmus Maria Gemma Peters, Nijmegen (NL)

(73) Assignee: Teijin Aramid B.V., Arnhem (NL)

( * ) Notice: Subject to any disclaimer, the term of this patent is extended or adjusted under 35 U.S.C. 154(b) by 0 days.

(21) Appl. No.: 12/999,813

(22) PCT Filed: Jun. 18, 2009

(86) PCT No.: PCT/EP2009/057614
§ 371 (c)(1),
(2), (4) Date: Dec. 17, 2010

(87) PCT Pub. No.: WO2009/153318
PCT Pub. Date: Dec. 23, 2009

(65) Prior Publication Data
US 2011/0095447 A1    Apr. 28, 2011

(30) Foreign Application Priority Data
Jun. 19, 2008    (EP) .................................... 08158581

(51) Int. Cl.
*B29C 43/00*    (2006.01)
*B29C 43/10*    (2006.01)
*B29C 43/22*    (2006.01)
*B29C 55/06*    (2006.01)

(52) U.S. Cl.
USPC ........... 264/119; 264/120; 264/123; 264/125; 264/126; 264/175; 264/210.1; 264/288.4; 264/288.8; 264/289.3; 264/294; 264/313; 264/316; 264/320; 264/322; 264/338; 264/DIG. 65

(58) Field of Classification Search
None
See application file for complete search history.

(56) References Cited

U.S. PATENT DOCUMENTS

| | | | |
|---|---|---|---|
| 3,159,526 A |   | 12/1964 | Van Hartesveldt |
| 3,286,008 A |   | 11/1966 | Powers et al. |
| 3,853,442 A |   | 12/1974 | Stemp |
| 4,311,550 A | * | 1/1982 | Kerttula .................. 156/555 |
| 4,353,855 A | * | 10/1982 | Garabedian ............. 264/126 |
| 4,375,350 A |   | 3/1983 | Sato |

(Continued)

FOREIGN PATENT DOCUMENTS

| CN | 1654192 A | 8/2005 |
|---|---|---|
| DE | 2922152 A1 | 12/1980 |

(Continued)

OTHER PUBLICATIONS

Aug. 24, 2009 International Search Report issued in PCT/EP2009/057614.

(Continued)

Primary Examiner — Jeffrey Wollschlager
(74) Attorney, Agent, or Firm — Oliff PLC

(57) ABSTRACT

A process for manufacturing a film of ultra-high molecular weight polyolefin comprising: (a) subjecting a starting ultra-high molecular weight polyolefin with a weight average molecular weight of at least 500 000 gram/mole in powder form to a compacting step using an isobaric press; and (b) subjecting the compacted polyolefin to a rolling step and at least one stretching step under such conditions that at no point during the processing of the polymer its temperature is raised to a value above its melting point. The process allows for the manufacture of ultra-high molecular weight polyolefin films of high quality.

8 Claims, 2 Drawing Sheets

(56) References Cited

U.S. PATENT DOCUMENTS

| | | | |
|---|---|---|---|
| 4,879,076 A | | 11/1989 | Sano et al. |
| 5,091,133 A | * | 2/1992 | Kobayashi et al. ............ 264/119 |
| 5,106,558 A | * | 4/1992 | Kobayashi et al. ............ 264/119 |
| 5,200,129 A | | 4/1993 | Kobayashi et al. |
| 5,298,209 A | * | 3/1994 | Pagani et al. ................. 264/105 |
| 5,303,644 A | | 4/1994 | Held |
| 5,466,530 A | | 11/1995 | England et al. |
| 5,578,373 A | | 11/1996 | Kobayashi et al. |
| 5,612,125 A | | 3/1997 | Kobayashi et al. |
| 5,693,708 A | * | 12/1997 | Iwanami et al. ............... 524/585 |
| 5,702,657 A | * | 12/1997 | Yoshida et al. ................ 264/112 |
| 5,756,660 A | * | 5/1998 | Shiraishi et al. .......... 528/502 B |
| 6,017,480 A | | 1/2000 | Yoshida et al. |
| 6,389,594 B1 | | 5/2002 | Yavin |
| 6,454,102 B2 | * | 9/2002 | Thompson .................... 210/386 |
| 6,592,983 B1 | * | 7/2003 | Carson et al. ................. 428/323 |
| 6,823,584 B2 | * | 11/2004 | Schaefer et al. ................ 29/825 |
| 6,994,210 B2 | * | 2/2006 | Kerwel et al. ................ 198/847 |
| 7,976,930 B2 | * | 7/2011 | Weedon et al. ............... 428/156 |
| 2003/0160352 A1 | * | 8/2003 | Middelman ................... 264/104 |
| 2004/0080068 A1 | * | 4/2004 | Ooizumi et al. ................ 264/41 |
| 2005/0145360 A1 | * | 7/2005 | Hikida ....................... 162/358.4 |
| 2005/0161855 A1 | | 7/2005 | Brown et al. |
| 2006/0142521 A1 | | 6/2006 | Rastogi et al. |
| 2008/0237926 A1 | | 10/2008 | Matz et al. |
| 2008/0251960 A1 | | 10/2008 | Harding et al. |

FOREIGN PATENT DOCUMENTS

| | | |
|---|---|---|
| EP | 0 467 323 A2 | 1/1992 |
| EP | 529214 A2 | 3/1993 |
| JP | A-50-107051 | 8/1975 |
| JP | A-4-158013 | 6/1992 |
| JP | A-4-208418 | 7/1992 |
| JP | A-7-156175 | 6/1995 |
| JP | A-8-174658 | 7/1996 |
| JP | A-11268060 | 10/1999 |
| JP | A-2008-6435 | 1/2008 |
| WO | WO 01/21668 A1 | 3/2001 |

OTHER PUBLICATIONS

Rastogi, Sanjay, "Heterogeneity in Polymer Melts From Melting of Polymer Crystals," Nature Materials, vol. 4, Aug. 2005, pp. 635-641.

Lippits, Dirk, "Controlling the Melting Kinetics of Polymers; a Route to a New Melt State," 2007, pp. 8-156.

Aug. 24, 2009 Written Opinion of the International Searching Authority issued in PCT/EP2009/057614.

Notification of Reasons for Refusal dated Sep. 4, 2013 from Japanese Patent Application No. 2011-514046 (with English-language translation).

Pankoke; *Continuous Press Technology, Modern Plants for Board Products and Advanced Composites*; 1997; pp. 1-72.

\* cited by examiner

PROCESS FOR MANUFACTURING POLYOLEFIN FILMS

BACKGROUND

The present invention pertains to a process for manufacturing films of ultra-high molecular weight polyolefins.

U.S. Pat. No. 5,091,133 describes a method for manufacturing sheets of an ultra-high molecular weight polyolefin by the steps of feeding a polyolefin powder between a combination of endless belts disposed in an up-and-down opposing relation, compression molding the polyolefin powder at a temperature lower than the melting point of the polyolefin powder by means of a pressing device while holding the polyolefin powder between the endless belts, then rolling and stretching the resultant compression-molded polyolefin.

EP 0 467 323 describes a process for the manufacture of coloured films of ultra-high molecular weight polyethylene wherein a dye is added to powdered ultra-high molecular weight polyethylene, which is then subjected to compaction-moulding and stretching.

U.S. Pat. No. 4,879,076 describes a method for manufacturing polyethylene materials by a process comprising compacting and stretching wherein the compacting is carried out in an extruder or in an undefined press.

While the process described in U.S. Pat. No. 5,091,133 above gives a product with acceptable properties, it has been found that there is still room for improvement. In particular, for the manufacture of films with a very high stretching ratio, the process as described in U.S. Pat. No. 5,091,133 may result in products with inhomogeneous quality. An inhomogeneous quality will, int. al., limit the tensile strength of the film.

Accordingly, there is need for a process for the manufacture of films of ultra-high molecular weight polyolefins which results in a product with higher homogeneity, a higher tensile strength, and other desirable physical properties. The process according to the invention also allows the manufacture of wider tapes.

SUMMARY

The present invention is thus directed to a process for manufacturing a film of ultra-high molecular weight polyethylene comprising the steps of
  subjecting a starting ultra-high molecular weight polyolefin with a weight average molecular weight of at least 500 000 gram/mole in powder form to a compacting step using an isobaric press
  subjecting the compacted polyolefin to a rolling step and at least one stretching step under such conditions that at no point during the processing of the polymer its temperature is raised to a value above its melting point.

The process according to the invention allows the manufacture of high quality polymer films, with high homogeneity. The resulting product has constant quality, high strength, a high homogeneity over its width and a homogeneous density distribution. Other advantages of the present process will become evident from the further specification below.

It is noted that U.S. Pat. No. 4,353,855 describes a process for manufacturing stress free plastic articles by compacting a polymer powder in a mold using a fluid-like pressure. However, the pressing step is carried out at a temperature above the melting point of the polymer, and no subsequent stretching step is carried out.

The present invention will be described in more detail below.

BRIEF DESCRIPTION OF THE DRAWINGS

A number of embodiments of the invention are described in detail and by way of example only with reference to the accompanying drawings.

DETAILED DESCRIPTION OF EMBODIMENTS

In the first step of the process according to the invention a polyolefin powder is compacted in an isobaric press. An isobaric press is a press where pressure applied to the material to be compacted is constant, independent from the thickness of the material to be compacted. This is in contrast with isochoric presses, where the thickness of the end product is constant, and the pressure applied varies with the thickness of the material to be compacted. Isobaric presses are known in the art, and are commercially available from, e.g., Hymmen GmbH in Germany. However, the use of an isobaric press in a process for the manufacture of a film of ultra-high molecular weight polyolefin has not previously been described.

In one embodiment of the present invention, the isobaric press used has such a pressure distribution that the ratio of the pressure to the density of the compacted material is constant at every point of the material being compacted. It should be noted that a press can comprise more than one compression zone, which may be operated at different pressures.

A suitable isobaric press for use in the present invention will now be described with reference to FIG. 1. It is noted that, as will be evident to the skilled person, the various advantageous embodiments discussed below are not limited to the specific apparatus.

Figure 1:
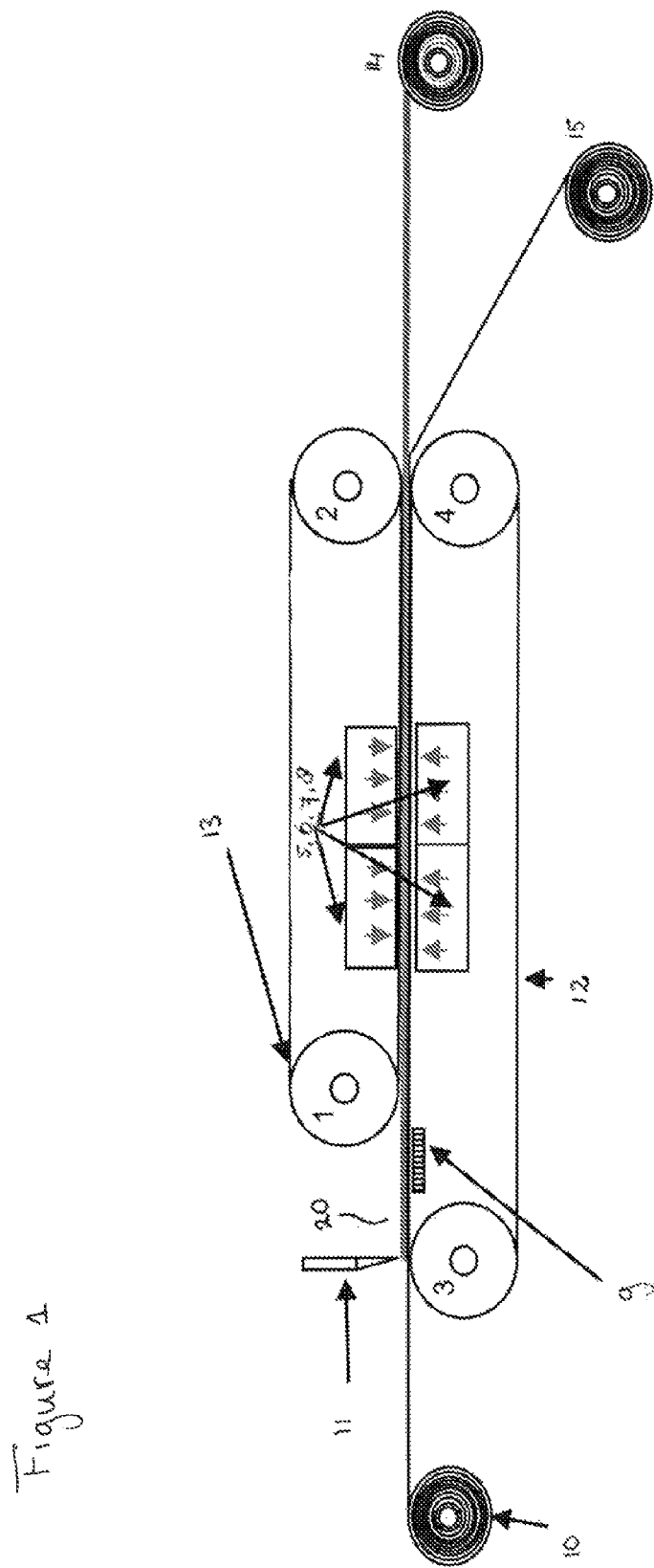
FIG. 1 is a schematic view showing an isobaric press configuration suitable for use in a first embodiment of the invention.

In FIG. 1 the apparatus comprises two pairs of rollers 1, 2, and 3, 4, and a pair of endless belts 12, 13 disposed taut in a vertically opposing relation by the rollers 1-4. Pairs of opposed compression cushions 5, 6, 7 and 8 are mounted inside the belts 12, 13, whereby the polyolefin is sandwiched between the belts 12, 13 and the belts 12, 13 transfer the pressure to the polyolefin. The pressure cushions 5, 6, 7 and 8 preferably comprise (inside) a gaseous and/or a liquid medium for exerting pressure to the polyolefin. For example oil and/or air can be used as medium. It is possible to use a single pair of pressure cushions, or a plurality of pairs of pressure cushions. Due to the fact that the medium can be heated, the temperature of the polyolefin can be controlled very accurate during the compression. In fact, to obtain the advantages associated with the present invention, good temperature control is essential, as will be discussed below.

As alternative to a heatable medium inside the pressure cushions 5, 6, 7 and 8, the pressure cushions 5, 6, 7 and 8 can be heated by an external heating device (e.g. microwaves or infrared). It is also possible to cool the compacted material by active or inactive cooling with additional pressure cushions (16, 17 FIG. 2) to prevent sticking on the endless belts 12, 13. The use of an isobaric press equipped with pressure cushions 1-4 to apply pressure to the polyolefin guarantees a uniform pressure in the width and length over the compression zone, and therefore is a preferred embodiment of the present invention as will be elucidated in more detail below.

In FIG. 1, a starting polyolefin powder can be fed from a hopper system onto the endless belt 12, generally before a doctor blade 11. Before the compression step, the starting polyolefin 20 on the belt is preheated to improve ductility upon (hot) pressing using a preheating plate 9. The pre-heating of the polyolefin powder causes an increase of the static charge of the powder particles, which will have a negative influence on homogeneity of the polyolefin powder layer. To overcome this static charge, the powder is dosed on the cold endless belt 12. The same endless belt 12 is heated in the compression zone, which means that a cooling of belt 12 is necessary before the polyolefin powder is dosed. The continuous heating and cooling of the belt 12 will exert high internal tensions on the belt and cause frequent failures of the belt 12. In a preferred embodiment of the present invention, in order to avoid the heating and cooling cycle of belt 12, the polyolefin powder is not dosed directly on belt 12 but on a support belt 10 running in between belts 12, 13. The support belt 10 is heated by heating plate 9 and the temperature of belts 12, 13 in order to increase the temperature of the polyolefin above the softening point before entering the pressure zones. The heated polyolefin on the support belt 10 will be fed to the nip of the double belt press. When the polyolefin has been compressed, the thus-formed sheet of compacted polyolefin is provided to roll 14. The support belt 10 is rolled up in roll 15.

Figure 2:
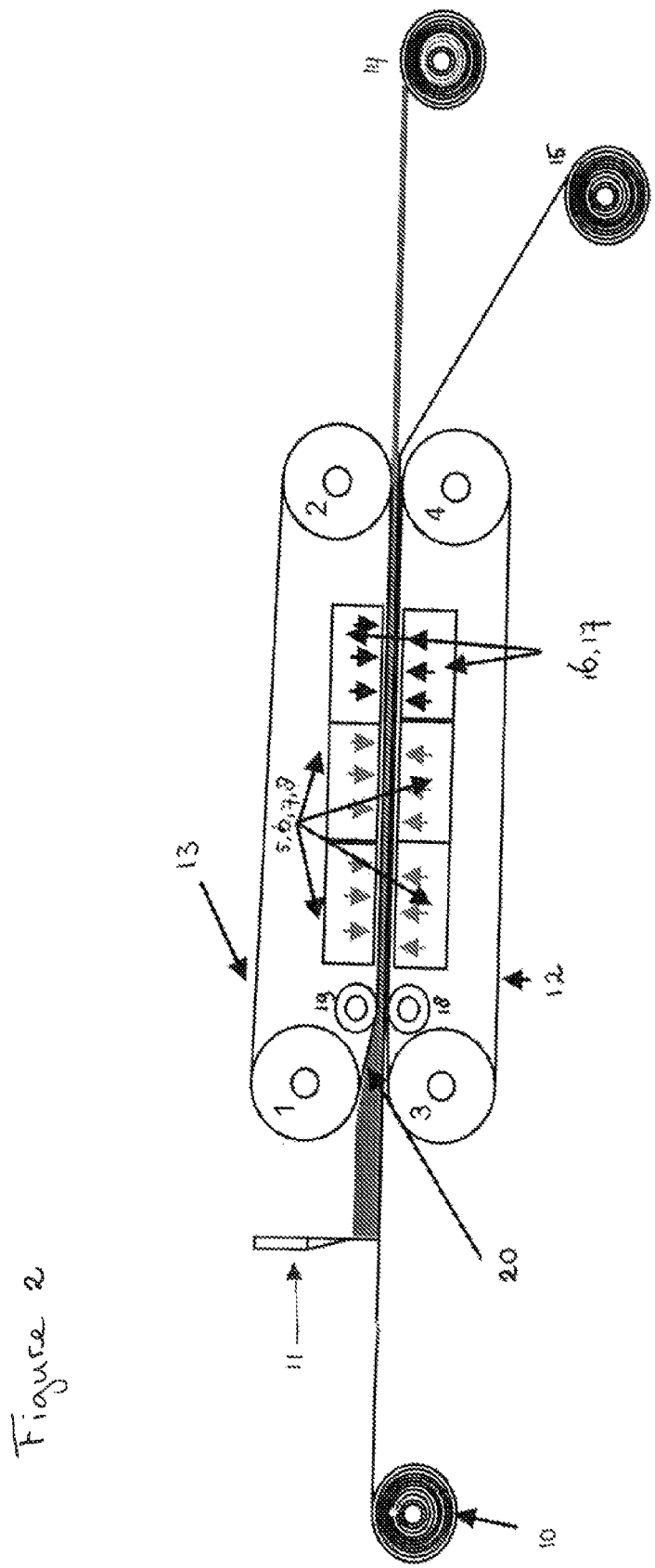
FIG. 2 is a schematic view showing an isobaric press configuration suitable for use in a second embodiment of the invention.

FIG. 2 shows a further embodiment of an isobaric press suitable for use in the present invention. In this embodiment, in addition to heating cushions 5, 6, 7, and 8, the press contains additional cushions 16, 17 which may be used cool the compacted polyolefin by active or inactive cooling to prevent sticking on the endless belts. In the embodiment of FIG. 2, a heating plate 9 is absent. Instead, the temperature of belts 12 and 13 determines the temperature of the polyolefin. In this embodiment, the doctor blade 11 is set up higher than in FIG. 1, so that a thicker layer of powder is obtained in the first instance. Two additional guiding rolls 18 and 19 are applied to guide the polyolefin 20 to the nip of the compression zone.

In a preferred embodiment of the present invention, in order to ease the entrapped air to come out of the layer of polyolefin powder in the nip, the entrance angle is kept under 4,5°, preferably under 3°, more preferably between 2.5° and 0.5°, in particular around 1,5°.

The nipped layer of polyolefin powder is compressed between the endless belts in the compression zone(s). Depending on the bulk density of the polyolefin powder, the compression step may take place in a single compression zone in the isobaric press, or more than one compression zones may be used, where the pressure in each further compression zone is higher that that in the previous compression zone. In a specific embodiment of the present invention the isobaric press contains two compression zones wherein the first compression zone is operated at a pressure of at most 10 bar, e.g., between 2 and 10 bar, more in particular between 3 and 8 bar, while the second compression zone is operated at a pressure of more than 10 bar, e.g., up to 80 bar. It should be noted that it is the use of an isobaric press which enables the use of such high pressures in combination with good temperature control. This embodiment is of particular interest where the polyolefin powder has a low bulk density, as will be elucidated in more detail below.

In one embodiment of the process according to the invention a press is used with an effective width of at least 250 mm, in particular a width of at least 400 mm, more in particular at least 1100 mm. The use of a wide press allows the manufacture of relatively wide films, while still employing a high stretching ratio.

The pressure applied is determined by the density of the compacted material that is to be achieved. To allow proper further processing of the material it is generally required to compact the material to a density of at least 95% of the theoretical polymer density, in particular at least 97%, more in particular at least 98%.

It has been found that if the material is compacted to a density below 95% of the theoretical polymer density the material may be too brittle to allow stretching of the material. Further, the cohesion and green strength of the material may be too low to allow proper further processing.

For an example, where the polyolefin is polyethylene, the theoretical polymer density is 0.97 g/cm3. Accordingly, pressure applied is generally selected such that the density of the compacted material is at least 0.92 g/cm3. More in particular, the pressure applied is selected such that the density of the compacted material is at least 0.93 g/cm3. Still more in particular, the pressure applied is selected such that the density of the compacted material is at least 0.94 g/cm3.

In general, the pressure applied in the compacting step is at least 5 bar, in particular at least 10 bar, more in particular at least 20 bar. Depending on the properties of the polymer, the pressure required to obtain the above density may be relatively high. In some embodiments, the pressure applied in the compacting step is at least 25 bar, in particular at least 30 bar, more in particular at least 35 bar, still more in particular at least 40 bar, even more in particular at least 45 bar, or at least 50 bar. Values of more than 80 bar are generally not required.

To allow obtaining the required density the compacting takes place at elevated temperature, specifically, at a temperature above the Vicat softening point of the polymer and below the unconstrained melting point of the polymer. For reasons of processing efficiency it is generally preferred to carry out the compacting step relatively close to the unconstrained melting point of the polymer. This will improve the ease of compaction and results in a material with a higher cohesion. A material with higher cohesion will in turn possess better stretching properties, which will result in a film with improved properties like tensile strength. However, it is an important feature of the present invention that the temperature during compacting is maintained below the unconstrained melting temperature of the polymer, in order to obtain a high-strength and high-modulus polymer material. Such a material will not be obtained when the product melts during compacting.

In the process according to the invention the compacting step is generally carried out at a temperature of at least 1° C. below the unconstrained melting point of the polymer. Depending on the nature of the polymer, it may be possible to carry out the compacting step at a temperature at least 3° C. below the unconstrained melting point of the polymer, still more in particular at least 5° C. below the unconstrained melting point of the polymer. Where it is possible to carry out the compacting at a temperature of more than 1° C. below the unconstrained melting temperature of the polymer, this is preferred for reasons of process efficiency. Generally, the compacting step is carried out at a temperature of at most 40° C. below the unconstrained melting point of the polymer, in particular at most 30° C. below the unconstrained melting point of the polymer, more in particular at most 10° C.

In a preferred embodiment of the process according to the invention, the temperature in the compacting step is kept constant within a temperature window of 2° C., in particular within a temperature window of 1° C. This results in a product with improved end properties. As indicated above, it is one of the features associated with the use of an isobaric press that such a narrow temperature window can be obtained.

The polymer is provided in the form of a powder. Suitable powders comprise particles which may have a particle size of up to 1000 micron, preferably up to 500 micron, more in particular up to 250 micron. The particles preferably have a particle size of at least 1 micron, more in particular at least 10 micron. The particle size distribution may be determined by laser diffraction (PSD, Sympatec Quixel) as follows. The sample is dispersed into surfactant-containing water and treated ultrasonic for 30 seconds to remove agglomerates/entanglements. The sample is pumped through a laser beam and the scattered light is detected. The amount of light diffraction is a measure for the particle size.

Depending on the nature of the polymer, the starting polymer powder generally has a bulk density between 0.08 and 0.6 g/cm3. The bulk density may be determined in accordance with ASTM-D1895. A fair approximation of this value can be obtained as follows. A sample of UHMWPE powder is poured into a measuring beaker of exact 100 ml. After scraping away the surplus of material, the weight of the content of the beaker is determined and the bulk density is calculated.

The bulk density is thus a measure of the percentage of air present in the polymer powder. The percentage of air present in the polymer powder can be calculated from the bulk density and the polymer density using the following formula:

Air percentage=100% (1−bulk density/polymer density)

In general, the air percentage of the polymer powder used in the process according to the invention is between 30 and 90%. In one embodiment of the present invention, the starting powder has an air percentage between 60 and 40%.

In another embodiment of the process according to the invention the starting powder has an air percentage of more than 60%, in particular more than 65%, still more in particular more than 70%. Conventionally, powders with such high air percentages have been found difficult to process into polymer films, and it has been found that the present invention allows the processing of such low density materials.

For an example, where the polymer is high molecular weight polyethylene, the bulk density will generally be between 0.08 and 0.6 g/cm3. In one embodiment, the polyolefin, in particular a high molecular weight polyethylene is used which has a relatively low bulk density as compared to the bulk density of conventional polyolefines, in particular high molecular weight polyethylenes. More in particular, the polyolefin used in the process according to the invention may have a bulk density below 0.50 g/cm3, in particular below 0.25 g/cm3, more in particular below 0.18 g/cm3, still more in particular below 0.13 g/cm3. This goes, for example, for the disentangled ultra-high molecular weight that will be discussed in more detail below.

In the process of the present invention the compacting step is carried out to integrate the polymer particles into a single object, e.g., in the form of a mother sheet. The mother sheet is subjected to a rolling step and then to a stretching step. The stretching step is carried out to provide orientation to the polymer and manufacture the final product. The compacting step and the stretching step are carried out at a direction perpendicular to each other. In the rolling step, compaction is combined with some stretching in the direction perpendicular to the compacting direction.

The stretching step in the process according to the invention is carried out to manufacture the polymer film. The stretching step may be carried out in one or more steps in a manner conventional in the art. A suitable manner includes leading the film in one or more steps over a set of rolls both rolling in process direction wherein the second roll rolls faster that the first roll. Stretching can take place over a hot plate or in an air circulation oven.

In general, in the process according to the invention the stretching step will be carried out under such conditions that a total stretching ratio is obtained of at least 30, in particular at least 50. Depending on the nature of the polymer, it may be possible and/or desirable to employ higher stretching ratios, more in particular at least 80, still more in particular at least 100, even more in particular at least 120, even more in particular at least 140, even more in particular at least 160. It has been found that in particular at these high stretching ratio's the advantages of the present invention will be more pronounced.

The total stretching ratio is defined as the area of the cross-section of the compacted sheet divided by the cross-section of the drawn film produced from this compacted sheet.

In the process according to the invention the stretching step is generally carried out at a temperature of at least 1° C. below the melting point of the polymer under process conditions. As the skilled person is aware, the melting point of polymers may depend on the constraint under which they are put. This means that the melting temperature under process conditions may vary from case to case. It can easily be determined as the temperature where the stress tension in the process drops sharply. Depending on the nature of the polymer, it may be possible to carry out the stretching step at a temperature at least 3° C. below the melting point of the polymer under process conditions, still more in particular at least 5° C. below the melting point of the polymer under process conditions. Generally, the stretching step is carried out at a temperature of at most 30° C. below the melting point of the polymer under process conditions, in particular at most 20° C. below the melting point of the polymer under process conditions, more in particular at most 15° C.

In one embodiment, the polymer is an ultra-high molecular weight polyethylene (UHMWPE) with a weight average molecular weight (Mw) of at least 500 000 gram/mole, in particular between $1.10^6$ gram/mole and $1.10^8$ gram/mole. The molecular weight distribution and molecular weigh averages (Mw, Mn, Mz) of the polymer may be determined in accordance with ASTM D 6474-99 at a temperature of 160° C. using 1,2,4-trichlorobenzene (TCB) as solvent. Appropriate chromatographic equipment (PL-GPC220 from Polymer Laboratories) including a high temperature sample preparation device (PL-SP260) may be used. The system is calibrated using sixteen polystyrene standards (Mw/Mn<1.1) in the molecular weight range $5*10^3$ to $8*10^6$ gram/mole.

The molecular weight distribution may also be determined using melt rheometry. Prior to measurement, a polyethylene sample to which 0.5 wt % of an antioxidant such as IRGANOX 1010 has been added to prevent thermo-oxidative degradation, would first be sintered at 50° C. and 200 bars. Disks of 8 mm diameter and thickness 1 mm obtained from the sintered polyethylenes are heated fast (~30° C./min) to well above the equilibrium melting temperature in the rheometer under nitrogen atmosphere. For an example, the disk was kept at 180 C for two hours or more. The slippage between the sample and rheometer discs may be checked with the help of an oscilloscope. During dynamic experiments two output signals from the rheometer i.e. one signal corresponding to sinusoidal strain, and the other signal to the resulting stress response, are monitored continuously by an oscilloscope. A perfect sinusoidal stress response, which can be achieved at low values of strain was an indicative of no slippage between the sample and discs.

Rheometry may be carried out using a plate-plate rheometer such as Rheometrics RMS 800 from TA Instruments. The Orchestrator Software provided by the TA Instruments, which makes use of the Mead algorithm, may be used to determine molar mass and molar mass distribution from the modulus vs. frequency data determined for the polymer melt. The data is obtained under isothermal conditions between 160-220° C. To get the good fit angular frequency region between 0.001 to 100 rad/s and constant strain in the linear viscoelastic region between 0.5 to 2% should be chosen. The time-temperature superposition is applied at a reference temperature of 190° C. To determine the modulus below 0.001 frequency (rad/s) stress relaxation experiments may be performed. In the stress relaxation experiments, a single transient deformation (step strain) to the polymer melt at fixed temperature is applied and maintained on the sample and the time dependent decay of stress is recorded.

The unconstrained melting temperature of the starting polymer is between 138 and 142° C. and can easily be determined by the person skilled in the art. With the values indicated above this allows calculation of the appropriate operating temperature.

The determination of the unconstrained melting point may be carried out by DSC (differential scanning calorimetry) in nitrogen, over a temperature range of +30 to +180° C. and with an increasing temperature rate of 10° C./minute. The maximum of the largest endothermic peak at from 80 to 170° C. is evaluated here as the melting point.

The UHMWPE that is used in a preferred embodiment of the process according to the invention can be a homopolymer of ethylene or a copolymer of ethylene with a co-monomer which is another alpha-olefin or a cyclic olefin both with generally between 3 and 20 carbon atoms. Examples include propene, 1-butene, 1-pentene, 1-hexene, 1-heptene, 1-octene, cyclohexene, etc. The use of dienes with up to 20 carbon atoms is also possible, e.g., butadiene or 1-4 hexadiene. The amount of (non-ethylene) alpha-olefin in the ethylene homopolymer or copolymer used in the process according to the invention preferably is at most 10 mole %, preferably at most 5 mole %, more preferably at most 1 mole %. If a (non-ethylene) alpha-olefin is used, it is generally present in an amount of at least 0.001 mol. %, in particular at least 0.01 mole %, still more in particular at least 0.1 mole %. Obviously, the ranges given above for the starting material also apply to the final polymer film.

The process according to the invention is carried out in the solid state. The final polymer film has a polymer solvent content of less than 0.05 wt. %, in particular less than 0.025 wt. %, more in particular less than 0.01 wt. %.

The film according to the invention is a three-dimensional object which is characterised in that two of its dimensions are substantially larger than the third. More in particular, the ratio between the second smallest dimension, the width of the film, and the smallest dimension, the thickness of the film, is at least 50.

In one of its embodiments, the process according to the invention is suitable for the manufacture of films from UHMWPE with a tensile strength of at least 1.0 GPa, a tensile energy to break of at least 15 J/g, and a Mw of at least 500 000 gram/mole.

The tensile strength is determined in accordance with ASTM D882-00. Depending on the stretching ratio and stretching temperature, tensile strengths may be obtained of at least 1.3 GPa, at least 1.5 Gpa, or at least 1.7 GPa. In some embodiments, materials may be obtained with a tensile strength of at least 2.0 GPa. Sometimes a tensile strength of at least 2.5 GPa may be obtained, in particular at least 3.0 GPa, more in particular at least 3.5 GPa. Tensile strengths of at least 4 GPa may also be obtained.

The tensile energy to break is determined in accordance with ASTM D882-00 using a strain rate of 50%/min. It is calculated by integrating the energy per unit mass under the stress-strain curve. Depending on the stretching ratio, films may be obtained according to the invention which have a tensile energy to break of at least 15 J/g, or a tensile energy to break of at least 25 J/g. In some embodiments a material may be obtained with a tensile energy to break of at least 30 J/g, in particular at least 40 J/g GPa, more in particular at least 50 J/g GPa.

The modulus of the UHMWPE film manufactured by the process according to the invention is generally at least 75 GPa. The modulus is determined in accordance with ASTM D822-00. Depending on the stretching ratio, moduli may be obtained of at least 85 GPa. In some embodiments moduli may be obtained of at least 100 GPa, more in particular at least 120 GPa. It is possible to obtain moduli of at least 140 GPa, or at least 150 GPa.

It may be preferred for the ultra-high molecular weight polyethylene used in the present invention to have a relatively narrow molecular weight distribution. This is expressed by the Mw (weight average molecular weight) over Mn (number average molecular weight) ratio of at most 8. More in particular the Mw/Mn ratio is at most 6, still more in particular at most 4, even more in particular at most 2.

In one embodiment, an ultra-high molecular weight polyethylene is used which has an elastic shear modulus $G_N^0$ determined directly after melting at 160° C. of at most 1.4 MPa, in particular 1.0 MPa, more in particular at most 0.9 MPa, still more in particular at most 0.8 MPa, more in particular at most 0.7 MPa. The wording "directly after melting" means that the elastic shear modulus is determined as soon as the polymer has melted, in particular within 15 seconds after the polymer has melted. For this polymer melt $G_N^0$ typically increases from 0.6 to 2.0 MPa in one, two, or more hours, depending on the molar mass of the polymer. $G_N^0$ is the elastic shear modulus in the rubbery plateau region. It is related to the average molecular weight between entanglements Me, which in turn is inversely proportional to the entanglement density. In a thermodynamically stable melt having a homogeneous distribution of entanglements, Me can be calculated from $G_N^0$ via the formula $G_N^0 = g_N \rho RT/M_e$, where $g_N$ is a numerical factor set at 1, rho is the density in g/cm3, R is the gas constant and T is the absolute temperature in K. A low elastic shear modulus directly after melting stands for long stretches of polymer between entanglements, and thus for a low degree of entanglement. The adopted method for the investigation on changes in $G_N^0$ with the entanglements formation is the same as described in publications (Rastogi, S., Lippits, D., Peters, G., Graf, R., Yefeng, Y. and Spiess, H., "Heterogeneity in Polymer Melts from Melting of Polymer Crystals", Nature Materials, 4(8), 1 Aug. 2005, 635-641 and PhD thesis Lippits, D. R., "Controlling the melting kinetics of polymers; a route to a new melt state", Eindhoven University of Technology, dated 6 Mar. 2007, ISBN 978-90-386-0895-2). It has been found that this type polymer is attractive for ballistic purposes.

In a particular embodiment of the invention, the polyethylene is a disentangled UHMWPE. In the present specification, disentangled UHMWPE is characterised by a weight average molecular weight (Mw) of at least 500 000 gram/mole, a Mw/Mn ratio of at most 8, and an elastic modulus $G_N^0$, determined directly after melting at 160° C. of at most 1.4 MPa. The preferred ranges given above for these parameters also apply to the present embodiment.

Where the polymer is a polymer with an elastic modulus $G_N^0$, determined directly after melting at 160° C. of at most 1.4 MPa, it may be manufactured by a polymerisation process wherein ethylene, optionally in the presence of other monomers as discussed above, is polymerised in the presence of a single-site polymerisation catalyst at a temperature below the crystallisation temperature of the polymer, so that the polymer crystallises immediately upon formation. In particular, reaction conditions are selected such that the polymerisation speed is lower than the crystallisation speed. These synthesis conditions force the molecular chains to crystallize immediately upon their formation, leading to a rather unique morphology which differs substantially from the one obtained from the solution or the melt. The crystalline morphology created at the surface of a catalyst will strongly depend on the ratio between the crystallization rate and the growth rate of the polymer. Moreover, the temperature of the synthesis, which is in this particular case also crystallization temperature, will strongly influence the morphology of the obtained UHMWPE powder. In one embodiment the reaction temperature is between −50 and +50° C., more in particular between −15 and +30° C. It is well within the scope of the skilled person to determine via routine trial and error which reaction temperature is appropriate in combination with which type of catalyst, polymer concentrations and other parameters influencing the reaction.

To obtain a disentangled UHMWPE it is important that the polymerisation sites are sufficiently far removed from each other to prevent entangling of the polymer chains during synthesis. This can be done using a single-site catalyst which is dispersed homogenously through the crystallisation medium in low concentrations. More in particular, concentrations less than 1.10-4 mol catalyst per liter, in particular less than 1.10-5 mol catalyst per liter reaction medium may be appropriate. Supported single site catalyst may also be used, as long as care is taken that the active sites are sufficiently far removed from each other to prevent substantial entanglement of the polymers during formation.

Suitable methods for manufacturing starting UHMWPE used in the present invention are known in the art. Reference is made, for example to WO01/21668 and U.S. 20060142521.

The (disentangled) UHMWPE used in the process according to the invention preferably has a DSC crystallinity of at least 74%, more in particular at least 80%. The morphology of the films may be characterised using differential scanning calorimetry (DSC), for example on a Perkin Elmer DSC7. Thus, a sample of known weight (2 mg) is heated from 30 to 180° C. at 10° C. per minute, held at 180° C. for 5 minutes, then cooled at 10° C. per minute. The results of the DSC scan may be plotted as a graph of heat flow (mW or mJ/s; y-axis) against temperature (x-axis). The crystallinity is measured using the data from the heating portion of the scan. An enthalpy of fusion $\Delta H$ (in J/g) for the crystalline melt transition is calculated by determining the area under the graph from the temperature determined just below the start of the main melt transition (endotherm) to the temperature just above the point where fusion is observed to be completed. The calculated $\Delta H$ is then compared to the theoretical enthalpy of fusion ($\Delta H_c$ of 293 J/g) determined for 100% crystalline PE at a melt temperature of approximately 140° C. A DSC crystallinity index is expressed as the percentage $100(\Delta H/\Delta H_c)$.

Where disentangled UHMWPE is used in the invention the compacting and rolling step is generally carried out at a temperature of at least 1° C. below the unconstrained melting point of the polymer, in particular at least 3° C. below the unconstrained melting point of the polymer, still more in particular at least 5° C. below the unconstrained melting point of the polymer. Generally, the compacting step is carried out at a temperature of at most 40° C. below the unconstrained melting point of the polymer, in particular at most 30° C. below the unconstrained melting point of the polymer, more in particular at most 10° C. In the process of this embodiment the stretching step is generally carried out at a temperature of at least 1° C. below the melting point of the polymer under process conditions, in particular at least 3° C. below the melting point of the polymer under process conditions, still more in particular at least 5° C. below the melting point of the polymer under process conditions. As the skilled person is aware, the melting point of polymers may depend upon the constraint under which they are put. This means that the melting temperature under process conditions may vary from case to case. It can easily be determined as the temperature at which the stress tension in the process drops sharply. Generally, the stretching step is carried out at a temperature of at most 30° C. below the melting point of the polymer under process conditions, in particular at most 20° C. below the melting point of the polymer under process conditions, more in particular at most 15° C.

In one embodiment of the present invention, in particular for disentangled polyethylene, the stretching step encompasses at least two individual stretching steps, wherein the first stretching step is carried out at a lower temperature than the second, and optionally further, stretching steps. In one embodiment, the stretching step encompasses at least two individual stretching steps wherein each further stretching step is carried out at a temperature which is higher than the temperature of the preceding stretching step. As will be evident to the skilled person, this method can be carried out in such a manner that individual steps may be identified, e.g., in the form of the films being fed over individual hot plates of a specified temperature. The method can also be carried out in a continuous manner, wherein the film is subjected to a lower temperature in the beginning of the stretching process and to a higher temperature at the end of the stretching process, with a temperature gradient being applied in between. This embodiment can for example be carried out by leading the film over a hot plate which is equipped with temperature zones, wherein the zone at the end of the hot plate nearest to the compaction apparatus has a lower temperature than the zone at the end of the hot plate furthest from the compaction apparatus. In one embodiment, the difference between the lowest temperature applied during the stretching step and the highest temperature applied during the stretching step is at least 3° C., in particular at least 7° C., more in particular at least 10° C. In general, the difference between the lowest temperature applied during the stretching step and the highest temperature applied during the stretching step is at most 30° C., in particular at most 25° C.

Where the polyethylene is disentangled polyethylene it has also been found that, as compared to conventional processing of UHMWPE, materials with a strength of at least 2 GPa can be manufactured at higher deformation speeds. The deformation speed is directly related to the production capacity of the equipment. For economical reasons it is important to produce at a deformation rate which is as high as possible without detrimentally affecting the mechanical properties of the film. In particular, it has been found that it is possible to manufacture a material with a strength of at least 2 GPa by a process wherein the stretching step that is required to increase the strength of the product from 1.5 GPa to at least 2 GPa is carried out at a rate of at least 4% per second. In conventional polyethylene processing it is not possible to carry out this stretching step at this rate. While in conventional UHMWPE processing the initial stretching steps, to a strength of, say, 1 or 1.5 GPa may be carried out at a rate of above 4% per second, the final steps, required to increase the strength of the film to a value of 2 GPa or higher, must be carried out at a rate well below 4% per second, as otherwise the film will break. In contrast, in the process according to the invention it has been found that it is possible to stretch intermediate film with a strength of 1.5 GPa at a rate of at least 4% per second, to obtain a material with a strength of at least 2 GPa. For further preferred values of the strength reference is made to what has been stated above. It has been found that the rate applied in this step may be at least 5% per second, at least 7% per second, at least 10% per second, or even at least 15% per second.

The strength of the film is related to the stretching ratio applied. Therefore, this effect can also be expressed as follows. In one embodiment of the invention, the stretching step of the process according to the invention can be carried out in such a manner that the stretching step from a stretching ratio of 80 to a stretching ratio of at least 100, in particular at least 120, more in particular at least 140, still more in particular of at least 160 is carried out at the stretching rate indicated above.

In still a further embodiment, the stretching step of the process according to the invention can be carried out in such a manner that the stretching step from a material with a modulus of 60 GPa to a material with a modulus of at least at least 80 GPa, in particular at least 100 GPa, more in particular at least 120 GPa, at least 140 GPa, or at least 150 GPa is carried out at the rate indicated above.

It will be evident to the skilled person that the intermediate products with a strength of 1.5 GPa, a stretching ratio of 80, and/or a modulus of 60 GPa are used, respectively, as starting point for the calculation of when the high-rate stretching step starts. This does not mean that a separately identifiable stretching step is carried out where the starting material has the specified value for strength, stretching ratio, or modulus. A product with these properties may be formed as intermediate product during a stretching step. The stretching ratio will then be calculated back to a product with the specified starting properties. It is noted that the high stretching rate described above is dependent upon the requirement that all stretching steps, including the high-rate stretching step or steps are carried out at a temperature below the melting point of the polymer under process conditions.

Where disentangled polyethylene is used in the present invention, the manufactured films may have a 200/110 uniplanar orientation parameter $\Phi$ of at least 3. The 200/110 uniplanar orientation parameter $\Phi$ is defined as the ratio between the 200 and the 110 peak areas in the X-ray diffraction (XRD) pattern of the tape sample as determined in reflection geometry.

Wide angle X-ray scattering (WAXS) is a technique that provides information on the crystalline structure of matter. The technique specifically refers to the analysis of Bragg peaks scattered at wide angles. Bragg peaks result from long-range structural order. A WAXS measurement produces a diffraction pattern, i.e. intensity as function of the diffraction angle $2\theta$ (this is the angle between the diffracted beam and the primary beam).

The 200/110 uniplanar orientation parameter gives information about the extent of orientation of the 200 and 110 crystal planes with respect to the tape surface. For a tape sample with a high 200/110 uniplanar orientation the 200 crystal planes are highly oriented parallel to the tape surface.

It has been found that a high uniplanar orientation is generally accompanied by a high tensile strength and high tensile energy to break. The ratio between the 200 and 110 peak areas for a specimen with randomly oriented crystallites is around 0.4. However, in the tapes that are preferentially used in one embodiment of the present invention the crystallites with indices 200 are preferentially oriented parallel to the film surface, resulting in a higher value of the 200/110 peak area ratio and therefore in a higher value of the uniplanar orientation parameter.

The value for the 200/110 uniplanar orientation parameter may be determined using an X-ray diffractometer. A Bruker-AXS D8 diffractometer equipped with focusing multilayer X-ray optics (Göbel mirror) producing Cu-K$\alpha$ radiation (K wavelength=1.5418 Å) is suitable. Measuring conditions: 2 mm anti-scatter slit, 0.2 mm detector slit and generator setting 40 kV, 35 mA. The tape specimen is mounted on a sample holder, e.g. with some double-sided mounting tape. The preferred dimensions of the tape sample are 15 mm×15 mm (l×w). Care should be taken that the sample is kept perfectly flat and aligned to the sample holder. The sample holder with the tape specimen is subsequently placed into the D8 diffractometer in reflection geometry (with the normal of the tape perpendicular to the goniometer and perpendicular to the sample holder). The scan range for the diffraction pattern is from 5° to 40° (2$\theta$) with a step size of 0.02° (2$\theta$) and a counting time of 2 seconds per step. During the measurement the sample holder spins with 15 revolutions per minute around the normal of the tape, so that no further sample alignment is necessary. Subsequently the intensity is measured as function of the diffraction angle $2\theta$. The peak area of the 200 and 110 reflections is determined using standard profile fitting software, e.g. Topas from Bruker-AXS. As the 200 and 110 reflections are single peaks, the fitting process is straightforward and it is within the scope of the skilled person to select and carry out an appropriate fitting procedure. The 200/110 uniplanar orientation parameter is defined as the ratio between the 200 and 110 peak areas. This parameter is a quantitative measure of the 200/110 uniplanar orientation.

As indicated above, in one embodiment the films have a 200/110 uniplanar orientation parameter of at least 3. It may be preferred for this value to be at least 4, more in particular at least 5, or at least 7. Higher values, such as values of at least 10 or even at least 15 may be particularly preferred. The theoretical maximum value for this parameter is infinite if the peak area 110 equals zero. High values for the 200/110 uniplanar orientation parameter are often accompanied by high values for the strength and the energy to break.

In one embodiment, the width of the film is generally at least 5 mm, in particular at least 10 mm, more in particular at least 20 mm, still more in particular at least 40 mm. The width of the film is generally at most 200 mm. The thickness of the film is generally at least 8 microns, in particular at least 10 microns. The thickness of the film is generally at most 150 microns, more in particular at most 100 microns. In one embodiment, films are obtained with a high strength, as described above, in combination with a high linear density. In the present application the linear density is expressed in dtex. This is the weight in grams of 10.000 meters of film. In one embodiment, the film according to the invention has a denier of at least 3000 dtex, in particular at least 5000 dtex, more in particular at least 10000 dtex, even more in particular at least 15000 dtex, or even at least 20000 dtex, in combination with strengths of as specified above, at least 2.0 GPa, in particular at least 2.5 GPA, more in particular at least 3.0 GPa, still more in particular at least 3.5 GPa, and even more in particular at least 4.

EXAMPLES

The present invention will be elucidated by the following Example, without being limited thereto or thereby.

Example 1

A polyolefinic powder with a bulk density of 453 g/L was compacted on an isobaric double belt press at different pressures. The density after compacting was determined by cutting a sample of 0.5 m² out of the sheet and weighing the sample. The results are presented in the following table:

| Pressure (bar) | Density (g/cm³) |
|---|---|
| 30 | 0.90 |
| 40 | 0.92 |
| 50 | 0.94 |
| 60 | 0.95 |
| 70 | 0.95 |

The table shows that an increase in pressure results in an increase in density. A higher density of the compacted sheet gives a better green strength. A higher density is also a prerequisite for a higher tensile strength, a higher modulus and a higher energy to break for the tape out of the compacted sheet.

The table also shows that very high pressures can be obtained. It is noted that the pressure that may be obtained using an isochoric press is limited to 40 bar by the mechanical construction of the press with roller carpet. Also the width of the isochoric press limits the pressure: the wider the press, the lower the maximum pressure. Therefore it is difficult, and may be impossible to obtain densities of the stated magnitude using an isochoric press.

The invention claimed is:

1. A process for manufacturing a homogeneous film of ultra-high molecular weight polyolefin comprising:
    applying a starting ultra-high molecular weight polyolefin with a weight average molecular weight of at least 500,000 gram/mole in powder form on a releasable support belt at a distance upstream from an isobaric double belt press comprising a lower belt, an upper belt on top of the lower belt, and pressure cushions to apply pressure to the polyolefin at a compaction zone between the lower and upper belts;
    preheating the support belt to increase a temperature of the ultra-high molecular weight polyolefin above a softening point of the ultra-high molecular weight polyolefin before entering the compaction zone;
    subsequently feeding the support belt with the ultra-high molecular weight polyolefin into the compaction zone between the upper and lower belts of the isobaric press;
    subjecting the support belt with the ultra-high molecular weight polyolefin to a compacting step using the isobaric press, wherein the compacting step is carried out at a temperature of at least 1° C. below an unconstrained melting point of the polyolefin and wherein the temperature is maintained within a temperature window of 2° C. to form a single layer film of compacted polyolefin;
    discharging the support belt and the single layer film of compacted polyolefin from the upper and lower belts of the isobaric press;
    separating the film of compacted polyolefin from the support belt; and
    subjecting the single layer film of compacted polyolefin to a rolling step and at least one stretching step at a temperature of at least 1° C. below the melting point of the polyolefin under process conditions.

2. The process according to claim 1, wherein the isobaric press is a continuous double belt press.

3. The process according to claim 1, wherein the isobaric press is equipped with a nip, the nip having an entrance angle smaller than 4.5°.

4. The process according to claim 1, wherein the isobaric press has at least two pressure zones, and a first pressure zone is operated at a pressure of at most 10 bar and at least one subsequent pressure zone is operated at a pressure above 10 bar.

5. The process according to claim 1, wherein the pressure in the compacting step is at least 25 bar.

6. The process according to claim 1, wherein the stretching step is carried out under such conditions that a total stretching ratio is obtained of at least 30.

7. The process according to claim 1, wherein the staring polyolefin powder has a bulk density below 0.50 g/cm³.

8. A process for manufacturing a homogeneous film of ultra-high molecular weight polyolefin comprising:
    feeding an ultra-high molecular weight polyolefin with a weight average molecular weight of at least 500,000 gram/mole in powder form to a compaction zone of an isobaric double belt press comprising a lower belt, an upper belt on top of the lower belt, and pressure cushions;
    subjecting the ultra-high molecular weight polyolefin powder in the compaction zone to a pressure using the isobaric press at a temperature of at least 1° C. below an unconstrained melting point of the polyolefin and wherein the temperature is maintained within a temperature window of 2° C., a ratio of the pressure to the density of the compacted material being constant at every point of the compaction zone, to form a single layer sheet of compacted polyolefin; and
    subjecting the compacted polyolefin to a rolling step and at least one stretching step at a temperature of at least 1° C. below the melting point of the polyolefin under process conditions.

* * * * *